US010795707B2

United States Patent
Hay et al.

(10) Patent No.: US 10,795,707 B2
(45) Date of Patent: Oct. 6, 2020

(54) SYSTEMS AND METHODS FOR ENSURING COMPUTER SYSTEM SECURITY VIA A VIRTUALIZED LAYER OF APPLICATION ABSTRACTION

(71) Applicants: Peter McClelland Hay, Milton, FL (US); Donald William Hay, Keller, TX (US)

(72) Inventors: Peter McClelland Hay, Milton, FL (US); Donald William Hay, Keller, TX (US)

( * ) Notice: Subject to any disclaimer, the term of this patent is extended or adjusted under 35 U.S.C. 154(b) by 56 days.

(21) Appl. No.: 15/308,664

(22) PCT Filed: May 14, 2015

(86) PCT No.: PCT/US2015/030718
§ 371 (c)(1),
(2) Date: Nov. 3, 2016

(87) PCT Pub. No.: WO2015/175753
PCT Pub. Date: Nov. 19, 2015

(65) Prior Publication Data
US 2017/0185441 A1    Jun. 29, 2017

Related U.S. Application Data

(60) Provisional application No. 61/992,979, filed on May 14, 2014.

(51) Int. Cl.
*G06F 21/00* (2013.01)
*G06F 9/455* (2018.01)
(Continued)

(52) U.S. Cl.
CPC .......... *G06F 9/45558* (2013.01); *G06F 9/455* (2013.01); *G06F 21/53* (2013.01);
(Continued)

(58) Field of Classification Search
CPC ...... G06F 9/455; G06F 9/45558; G06F 21/53; G06F 21/566; G06F 21/577; G06F 2009/45562; H04L 63/145
See application file for complete search history.

(56) References Cited

U.S. PATENT DOCUMENTS 7,392,541 B2 * 6/2008 Largman ................. G06F 21/53
726/17
7,536,598 B2 * 5/2009 Largman ............. G06F 11/1417
714/13
(Continued)

FOREIGN PATENT DOCUMENTS

WO     WO-2008027564 A2 *  3/2008    ............. G06F 21/57

OTHER PUBLICATIONS

International Searching Authority, International Search Report and Written Opinion, International Application No. PCT/US2015/030718, dated Aug. 12, 2015 (mailing date).
(Continued)

*Primary Examiner* — Don G Zhao
(74) *Attorney, Agent, or Firm* — Marc A. Hubbard; Hubbard Johnston PLLC

(57) ABSTRACT

A processing system including a host system having a host processor, an associated host memory system, user interface, and a host operating system. The host operating system runs a virtualization program for creating a virtual machine including virtual hardware, a virtual operating system, and a virtual application program running in conjunction with the virtual operating system. The virtual machine instantiates the virtual application program in response to a user request through the user interface to initiate a function. In response to user inputs through the user interface, the virtual machine executes operations with the virtual application in conjunction with the virtual operating system to implement the requested function such that the host system is isolated from (Continued)

an attack initiated during execution of the virtual application program by the virtual machine.

24 Claims, 4 Drawing Sheets

(51) Int. Cl.
  *G06F 21/53* (2013.01)
  *G06F 21/56* (2013.01)
  *G06F 21/57* (2013.01)
  *H04L 29/06* (2006.01)
(52) U.S. Cl.
  CPC .......... *G06F 21/566* (2013.01); *G06F 21/577* (2013.01); *G06F 2009/45562* (2013.01); *H04L 63/145* (2013.01)

(56) References Cited

U.S. PATENT DOCUMENTS

| | | | | |
|---|---|---|---|---|
| 7,577,871 | B2* | 8/2009 | Largman | G06F 11/1417 714/13 |
| 7,788,699 | B2* | 8/2010 | Largman | G06F 11/1417 726/1 |
| 7,849,360 | B2* | 12/2010 | Largman | G06F 11/1417 714/13 |
| 9,009,836 | B1* | 4/2015 | Yarykin | G06F 9/45558 726/24 |
| 9,098,698 | B2* | 8/2015 | Ghosh | G06F 21/55 |
| 9,922,192 | B1* | 3/2018 | Kashyap | G06F 21/566 |
| 10,506,032 | B2* | 12/2019 | Largman | H04L 67/1034 |
| 2006/0253894 | A1* | 11/2006 | Bookman | H04L 63/08 726/2 |
| 2006/0277542 | A1* | 12/2006 | Wipfel | G06F 8/61 717/174 |
| 2007/0106993 | A1* | 5/2007 | Largman | G06F 9/5077 718/104 |
| 2007/0136579 | A1 | 6/2007 | Levy et al. | |
| 2008/0127348 | A1* | 5/2008 | Largman | G06F 21/56 726/24 |
| 2008/0127355 | A1 | 5/2008 | Lorch et al. | |
| 2008/0184218 | A1* | 7/2008 | Largman | G06F 8/65 717/168 |
| 2009/0089879 | A1* | 4/2009 | Wang | G06F 21/53 726/24 |
| 2009/0125902 | A1* | 5/2009 | Ghosh | G06F 9/45533 718/1 |
| 2010/0005531 | A1* | 1/2010 | Largman | G06F 21/53 726/24 |
| 2010/0190522 | A1* | 7/2010 | Orlassino | G06F 9/455 455/552.1 |
| 2011/0004680 | A1* | 1/2011 | Ryman | H04L 67/025 709/224 |
| 2011/0145833 | A1 | 6/2011 | De Los Reyes et al. | |
| 2012/0096271 | A1* | 4/2012 | Ramarathinam | H04L 63/0807 713/172 |
| 2012/0159479 | A1 | 6/2012 | Chardon et al. | |
| 2012/0278439 | A1 | 11/2012 | Ahiska et al. | |
| 2014/0006347 | A1 | 1/2014 | Qureshi et al. | |
| 2014/0137180 | A1* | 5/2014 | Lukacs | G06F 21/53 726/1 |
| 2014/0223556 | A1* | 8/2014 | Bignon | H04L 63/1441 726/22 |
| 2015/0046405 | A1* | 2/2015 | Brueckner | G06F 11/1469 707/684 |
| 2015/0178497 | A1* | 6/2015 | Lukacs | G06F 9/461 726/23 |
| 2015/0229656 | A1* | 8/2015 | Shieh | H04L 63/1408 726/22 |
| 2015/0237132 | A1* | 8/2015 | Antony | H04L 67/1095 709/224 |
| 2017/0083703 | A1* | 3/2017 | Abbasi | G06F 21/566 |
| 2017/0163661 | A1* | 6/2017 | Lazri | G06F 21/552 |
| 2017/0185441 | A1* | 6/2017 | Hay | G06F 9/455 |
| 2017/0214701 | A1* | 7/2017 | Hasan | H04L 63/1408 |
| 2017/0353496 | A1* | 12/2017 | Pai | G06F 21/53 |

OTHER PUBLICATIONS

Supplementary European Search Report received in European Application No. 15793196.5, dated Nov. 28, 2017, 11 pages.

* cited by examiner

SYSTEMS AND METHODS FOR ENSURING COMPUTER SYSTEM SECURITY VIA A VIRTUALIZED LAYER OF APPLICATION ABSTRACTION

CROSS-REFERENCE TO RELATED APPLICATION

The present application claims the benefit of U.S. Provisional Patent Application Ser. No. 61/992,979, filed May 14, 2014, which is incorporated herein by reference for all purposes.

FIELD OF INVENTION

The present invention relates in general to computer security and in particular to the use of virtual machines to reduce the risk of infection of a computer by attack.

BACKGROUND OF INVENTION

At present, the only computer that can be guaranteed to be virus-free is one that has just been purchased, unboxed and turned on for the first time. Viruses, Trojan horses, cross-site scripting, root kits, and many other attack vectors can compromise a computer simply by a user visiting a web site, opening a file attached to an e-mail, inserting a USB device, or by many other methods. These attack vectors take many forms and are constantly evolving.

Once compromised, a computer can remain infected for a very long time and cause great damage to the user. This damage can take the form of bank accounts being emptied, user computers being used as bots under the control of criminal syndicates, passwords being stolen, credit card theft, and more.

Sophisticated attacks affect more than single users in their homes. For example, Target Stores had a data breach in 2013 that caused 70 million credit card numbers to be stolen costing the retailer $162 million dollars and incalculable damage to its reputation.

Security programs, for example anti-virus, anti-malware, and anti-spyware programs, provide a certain level of protection, but can only react to known threats. Each time a new threat is deployed by undesirable entities, security companies attempt to locate and identify it, develop a detection and removal method, and deploy an update to their user base. This approach is known to take days, weeks or longer to work and is not adequate for today's connected world.

Hence, given the severity of the threat and the magnitude of damage that can be caused when a computer is compromised, it is critical that new security measures be invented and deployed to prevent the damage caused by successful infections.

SUMMARY OF INVENTION

The present invention generally relates to the use of virtual machines to execute applications in an isolated, protected and known-clean environment to greatly reduce the possibility of persistent infection by a computer virus, Trojan horse or other attack vector. A user's transparent use of an automated management tool to invoke virtualization of a wide variety of possible hardware configurations, operating system configurations, and similar applications, e.g., different Internet browser programs, provides an improvement from the conventional cumbersome, infection-prone environment to a "one-click" solution that automatically reverts to a known-clean and uninfected state.

According to the present principles, a virtual machine capable of running most commonly available user applications provides a virtual "air gap" between the actual "host" computer hardware and operating system (i.e., the host system) and the application program the user is actually using to implement a particular task or data processing function. More specifically, the virtual machine, which includes virtualized hardware, a virtualized operating system, and a virtualized application program for implementing the desired task or function, isolates the host hardware and operating system from attacks, which may occur during the execution of the virtual application program.

For example, in existing systems, if a user wishes to access the functionality of a Microsoft Excel spreadsheet, the user would either open Excel and then the desired spreadsheet or double-click on the desired spreadsheet file, which would open Excel and then automatically open the spreadsheet. If the spreadsheet has a compromised macro or other infection, the host computer would be infected at that moment.

In contrast, in a particular representative embodiment of the principles of the present invention, the user would still take the same steps to open Excel and the desired spread sheet, but a virtualization would transparently intervene and run a virtual machine that is known to be infection-free and capable of running Excel, transfer the spreadsheet to this virtual environment, automatically start Excel, and load the spreadsheet. If the spreadsheet is infected and compromises the virtual machine, the attack would only have access to the very limited data that is inside the virtual machine while the data on the host system remains safe. When the user is done with the spreadsheet and closes Excel, the virtual machine is also closed and reverts to its previously clean state. The host machine remains infection free and the user is protected.

Some embodiments of the principles of the present invention include the use of a management tool, which pseudo-randomly chooses an appropriate pre-configured virtual machine, which simulates one of several different hardware configurations, operating systems, security software packages (e.g., anti-virus, anti-malware, anti-spyware programs) and/or different program applications.

For example, currently, a user would click on a URL link in an e-mail which will open a web page. Existing systems would open their default browser and access the specified page. If that page has cross-site scripting, malicious Java script, or another attack vector, the host computer would be infected at that moment and the user's data compromised.

In contrast, in accordance with another particular representative embodiment of the present principles, the user would still click on the desired URL, but the management tool intervenes and take steps to protect the user. First, the management tool selects a pre-configured hardware virtualization that is known to have fewer exploits for browser-based attacks, for example an Intel XEON-, or AMD 770-based virtual computer. Second, the management tool selects, for the virtual machine, an operating system that is less vulnerable to attack such as Linux Mint or OS X for use in the virtual machine (i.e., the virtual operating system). Third, the management tool selects an appropriate browser such as Chrome or FireFox for the virtual machine (i.e., the virtual application program). Fourth, the management tool selects a fully-patched anti-attack software such as Norton or Kaspersky for the virtual machine (i.e., the virtual anti-attack software). Finally, the management tool instantiates the unique combination of these elements and presents the web page in the virtualized environment, shielding the host computer from infection. Should the web page contain an attack vector that can still compromise the unique virtual environment, the infection would only have access to the limited information that is present in the virtual machine. When the browser and thus the virtual machine is closed, the virtual machine would revert to its uninfected state and the host machine and thus the user's data would remain safe.

Additional features according to the present principles include a virtual machine manager, which provides automatic updates and deploys new virtual environments to the host computer. Preferably, the management tool could connect to an Internet cloud-based server to obtain new operating system/application/security system combinations in order to continually provide new and varying environments to thwart attacks. Alternatively, the management tool could receive these new environments via physical media such as a USB drive to minimize contact with the Internet.

Another feature is a management tool for detecting unauthorized changes to a virtualized environment and provide data to a centralized system on the types of attacks that have been detected inside the virtual machines. These data would enable the inventor's team to devise and deploy increasingly more effective virtual machine combinations to the host machines.

A further particular exemplary embodiment of the present principles includes a virtual machine manager that automatically closes a running instance of a virtual machine and starts another on a scheduled and controlled basis. This embodiment is advantageous in high risk environments, such as ATMs (Automated Teller Machines, which dispenses cash to customers of banks) or POS system (point of sale systems, which are used to calculate purchases and process payments at retail stores, such as the one at the heart of the Target breach). In this embodiment, the virtual machine that is running the ATM or POS software regularly and frequently automatically shuts down and restarts from a clean image, thus rendering any infection inert. The virtual machine manager may detect a period of non-use and a timer to determine that a fresh copy could be instantiated without disrupting the user.

In a final particular application of the present principles, a management tool transfers settings, files and preferences between the host machine and the virtualized environment on an as-needed basis. Preferably, all appropriate data are automatically transferred into the virtual machine when it is created, and transferred to a safe holding location on the host machine when the virtual machine is torn down. Examples of data transferred between the two systems are: favorites lists, history and settings for Internet browsers; source files, custom dictionary files and settings for Excel, Word and other processing programs; e-mail files and settings for e-mail programs such as Outlook; and PDF, image and other documents for viewing in readers and viewers.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
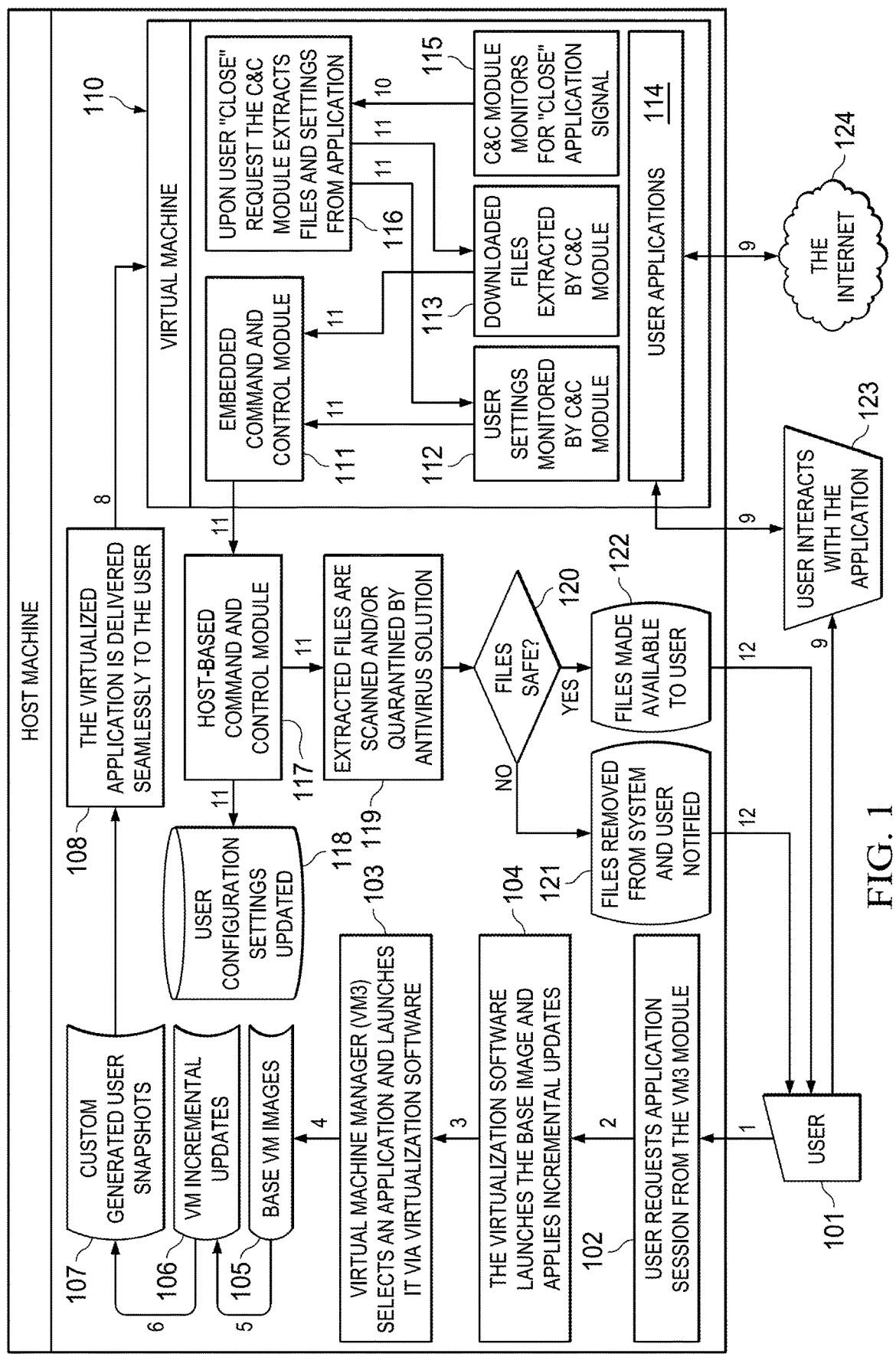
FIG. 1 is a high level block diagram showing the interaction between hardware and software resources in an exemplary data processing system embodying the principles of the present invention.

The principles of the present invention and their advantages are best understood by referring to the illustrated embodiment depicted in FIGS. 1-4 of the drawings, in which like numbers designate like parts.

In the following discussion, the terms "exploit", "copy-on-write", "attack vectors", "malware", "virtual machines", and "air-gap" will take on the following definitions, consistent with their current usage in the art.

An "exploit" is generally executable software code, data, or a set of commands, which takes advantage of software and/or hardware vulnerabilities, bugs, and/or glitches in a computer or other electronic hardware-software system to invoke actions (intended or unintended) by that system. Exemplary actions invoked by an exploit include assumption of control over the system, allowing privilege escalation, and denial-of-service attacks.

Generally, processing system performance can be optimized by taking advantage of circumstances when multiple separate tasks (processes) make use of identical copies of the same information. Under these circumstances, the given information is stored in a mutually accessible area in memory and each process is given a pointer to that information, which avoids the need to make separate copies to support each task. However, when one process modifies a local copy, there may be no provision to update the shared copy in mutually accessible memory.

Copy-on-write is a process for identifying when one process attempts to modify the shared information, for example, by making a private copy of the shared information, modifying the private copy, and then preventing the modifications from becoming visible to at least some other processes. The copy-on-write process runs within the operating system kernel and is transparent to all processes using the shared copy. Copy-on-write is also used for disk storage snapshots, as implemented by processes such as logical volume management, Microsoft Volume Shadow Copy Service, and file systems such as btrfs in Linux.

An "attack vector" generally refers to a process where malicious code (e.g., viruses or worms) propagates itself or infects a processing system. Common attack vectors include buffer overflows, HTML e-mail with JavaScript or other scripting enhancements or modifications, malicious e-mail attachments, and networking protocol flaws.

"Malware" (i.e., "malicious software") encompasses a wide range of hostile or intrusive software used to disrupt a processing system, capture sensitive data, and/or gain unauthorized access to a private computer system or network. Malware can be implemented using various types of software, including code, scripts, and active content. A few examples of malware are viruses, ransomware, worms, Trojan horses, rootkits, keyloggers, dialers, spyware, adware, malicious BHOs, rogue security software. Malware can be disguised as legitimate software or be a modified version of legitimate software with harmful code or scripts embedded within it. (In contrast to defective legitimate software, which contains glitches or bugs that were not corrected on release and could be harmful to the end user system).

A virtual machine is complete system platform capable of executing a complete operating system (OS). A typical virtual machine may emulate an existing computer architecture and be used, for example, as a platform for running programs when the real hardware and/or operating system is unavailable (e.g., the real hardware and/or operating system platform is obsolete). Multiple virtual machines may also be used to increase the efficiency of processing resources (e.g., "hardware virtualization", which is a key feature of cloud computing).

An "air gap" generally refers to a processing environment where processing and communications resources (e.g., terminals and networks) are separated by a physical barrier to ensure that only authorized data is transferred between systems on opposite sides of the air gap.

When data are moved from a high side resource to a low side resource, those data must be written to a physical medium by the high side resource, and then moved to the low side resource (the "air gap"). In the commonly used Bell-La Padula Confidentiality Model, data moves from a low side resource to a high side resource with reduced processing procedures, while data movement from a high side resource to a low side resource requires the application of more stringent processing procedures to ensure protection of the data at a higher level of classification.

An air gap maximizes the protection between two processing resources, since it is generally not possible for data (e.g., packets or datagrams) to "leap" across the air gap from one processing resource to another. By using an air gap, a processing resource essentially becomes a closed system, in terms of information signaling, and security, and is isolated from access from external processing resources. (One disadvantage is that the import of such things as data, software, and updates from an external processing resource can be difficult or very difficult).

Exploitation is accomplished in numerous manners but can be distilled to several basic concepts: attack vector, exploit and implant or malware. In particular, an attack vector is the way in which an attacker approaches a system. Common attack vectors include but are not limited to: Cross Site Scripting (XSS), viruses, e-mail attachments, Web pages, pop-up windows, instant messages, chat rooms, and deception. All of these methods involve programming (or, in a few cases, hardware), except deception, in which a human operator is fooled into removing or weakening system defenses. Combinations of attack vectors may be used to circumvent standard computer protections.

An exploit is then delivered via one or more of the above attack vectors. The purpose of the exploit is simply to gain arbitrary execution of code on the victim's computer. This exploit takes advantage of a bug, glitch or vulnerability in order to cause unintended or unanticipated behavior to occur on computer software, hardware, or something electronic (usually computerized). Such behavior frequently includes things like gaining control of a computer system or allowing privilege escalation or a denial-of-service attack.

The success or failure of an exploit is dependent on a variety of factors. Operating system, version number, patch level, running application, services or process, available protocols, security software, and even hardware come into play. An exploit only succeeds if these and other factors line up properly, making the exploit compatible with the target system.

Lastly some form of Malware is delivered to the target system. Simply put, malware is used to gain some sort of benefit to the attacker. These benefits vary as wildly as the types of attackers do: identity theft, intelligence gathering, bot-net sales, denial of service, advertising revenues and corporate espionage. The malware is usually hosted on some sort of server operating on the internet, and the target machine knowingly or unknowingly downloads and installs to the system.

The threat posed to the individual by Malware has increased drastically in recent years and advances in security program solutions and Personal Security Products have done little to stem the tide. Platform hardening, secure coding, workforce education and antivirus solutions are all part of a defense in-depth plan designed to make computer penetrations more difficult. However even in perfect concert they don't fully address the threat. There are many high-profile examples in the news of breaches of major companies where existing sophisticated security measures were defeated by malware and user data was stolen. A new approach is needed.

Currently, when a user activates a program such as a web browser, spreadsheet, e-mail client or a program attached to an e-mail, the host system runs the program and can be infected by any of a large number of methods. Some of those are described or defined elsewhere in this section. Once infected, the host system may remain infected for a very long time, permitting unauthorized use of the host system and significant damage to the user and their personal information.

The embodiments of the present inventive principles prevents targets of infection such as web browsers, e-mail clients, spreadsheets, and word processors from running directly on the Host computer and instead runs the applications in a virtualized environment. This creates a virtual "Air-Gap" between the Host computer and the guest virtual environment. Should an infection occur, it is confined to the virtual machine. This protects the Host computer from infection. When the application is closed the guest virtual machine is also closed, the infection is rendered inert and the user is protected.

FIG. 1 is a block diagram of a preferred system embodying these principles. The User in Block 101 requests a program be run. In current Microsoft Windows and Apple OSX systems, this could be by double clicking on a program such as Excel or Internet Explorer, or by clicking on a file such as a spreadsheet, which would run Excel and open the file, or on a link, which would open Internet Explorer. The Virtual Machine Management Module (VM3) in Block 102 determines which of the previously downloaded and configured virtual machines is capable of running the application requested by the user in Block 101 and the VM3 instantiates the virtual machine base image in Block 103 and applies any incremental updates and user snapshots shown in Blocks 105, 106 and 107 to the operating system, security software and application inside that virtual machine to meet the needs of the user established in Block 104. The physical location of these virtual machines is highly mutable and is determined by the security posture of the client architecture. In the simplest implementation virtual machines are provisioned locally on the host machine. In alternate implementations they are located remotely, whether on a virtual machine provisioning solutions on the local network, such as ESXi, or in the cloud similar to an EC2 instance, is again dependent on security posture. The user first experiences the application requested in Block 108, delivery of this user experience is accomplished locally via normal Input/Output methods, or remotely through technology such as Remote Desktop Sessions.

Block 111 is the embedded component of the Command And Control (C&C) Module which communicates with the Host-based component of the C&C Module (Block 117). This connection allows for secure transfer of user settings (Block 112) and file(s) (Block 113). The application opened at startup (Block 114) then opens the file or link transferred by Block 108 into the virtual machine and presents it to the user (Block 101) to interact with the application (Block 123) and the Internet (Block 124) as necessary.

During this phase the user might perform an action which infects the virtual machine; however, the polymorphic system of FIG. 1 greatly reduces the possibility of an infection by presenting a variety of combinations of operating system, security software and application software. Since most malware is targeted to specific combinations, it is less likely that an attack will be successful. Suppose that an attack was successful because a spreadsheet or document with a malicious macro was opened or a site with a virus was visited and the virtual machine is compromised. In existing systems, this can be catastrophic; however, by application of the present principles, the Host machine is protected because the malware cannot "jump the gap" to the host machine.

When the user is done with their session and clicks the close button, the Embedded C&C Module (Block 115 and Block 116) extracts files and user settings from the application that were modified during execution and transfers them (Block 111) to the Host-based C&C module in Block 117. Extracted files and other data are scanned by the host-based security products and the C&C module itself in Block 119. Block 120 determines if the files are safe or not. Safe files (Block 122) are made available to the user for future use (Block 101) and unsafe files are quarantined or deleted (Block 122).

Figure 2:
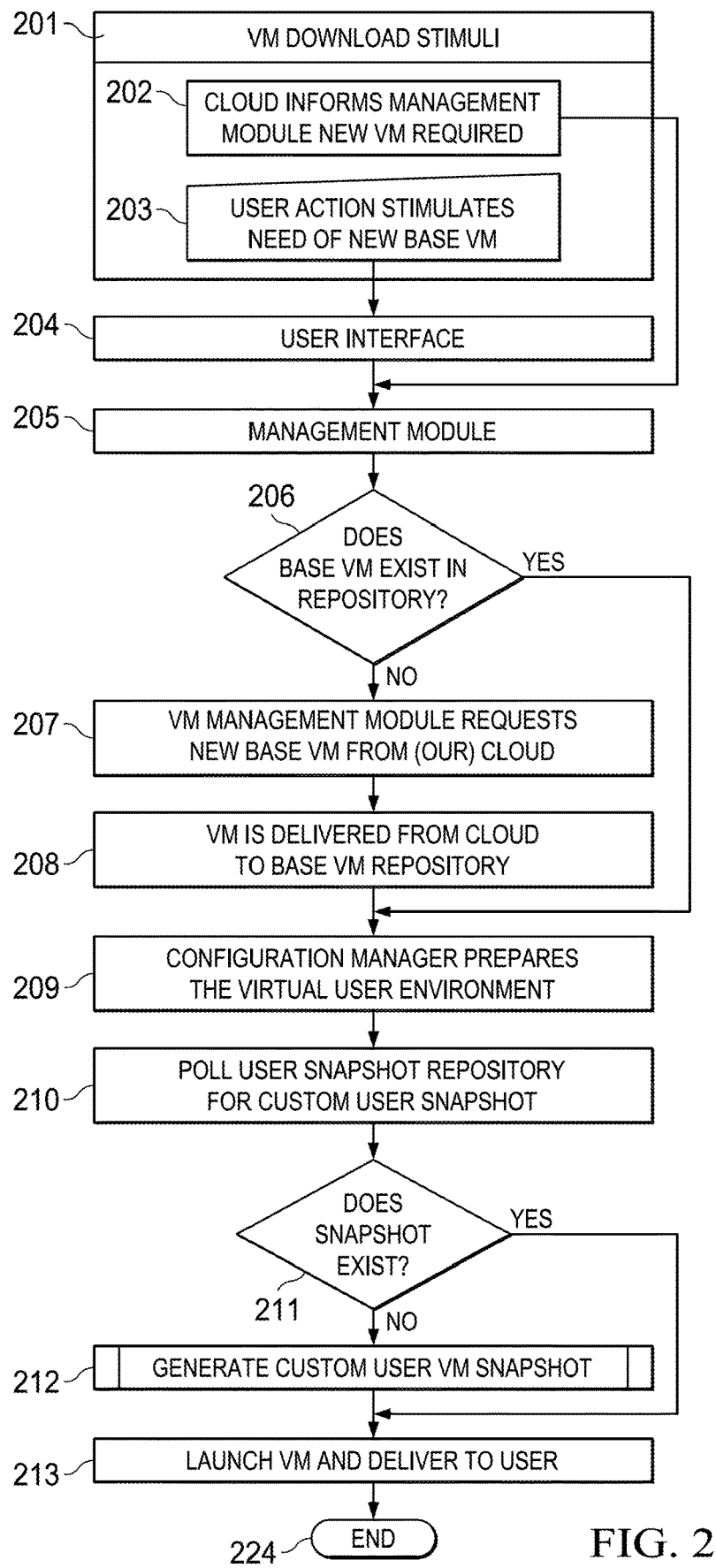
FIG. 2 is a flow chart illustrating a preferred process using a Virtual Machine Management Module (VM3) to download new images and update existing images to ensure a non-compromised environment for the user; and, FIGS. 3 and 4 are collectively a flow chart illustrating a preferred Virtual Machine Manager Module (VM3) Upgrade routine for creating a pseudo-randomized virtual machine by combining different operating systems, security systems and applications.

In a particular embodiment of the present principles, the virtual machines may be periodically updated using a Virtual Machine Monitor Module (VM3). Preferably, the VM3 is tasked with downloading, maintaining and ensuring the integrity of virtual machines that perform tasks required by the user. FIG. 2 illustrates a preferred Periodic Update function of the VM3 module. Block 201 consisting of Blocks 202 and 203 in FIG. 2 show two different times at which VM3 initiates an update or download of a new virtual machine.

The first type of update is initiated in Block 202 which shows a periodic or scheduled update, or an update commanded externally by a central system. In this implementation, the VM3 will receive information that a particular virtual machine is in need of maintenance or download and pass that information to the Management Module in Block 205. The second type of update is shown in Block 203 and is triggered when the user requests an action. VM3 passes the virtual machine requirements through the user interface in Block 204 to the Management Module in Block 205.

The Management Module in Block 205 then determines if that virtual machine configuration exists and is current in Block 206. If not, VM3 requests (Block 207) and downloads (Block 208) the virtual machine or the updates from the central server. VM3 then updates the old, or prepares the new, virtual machine according to the downloaded file and instructions (Block 209) and polls the user snapshot repository for any actions related to user preferences, configurations or other custom settings (Block 210). Block 211 will determine if a custom snapshot exists and generate one Block 212 if one does not exist.

If the request was initiated by the user, Block 213 will launch the virtual machine and present the application to the user, thus initiating the sequence shown in FIG. 1 and described previously.

Figure 3:
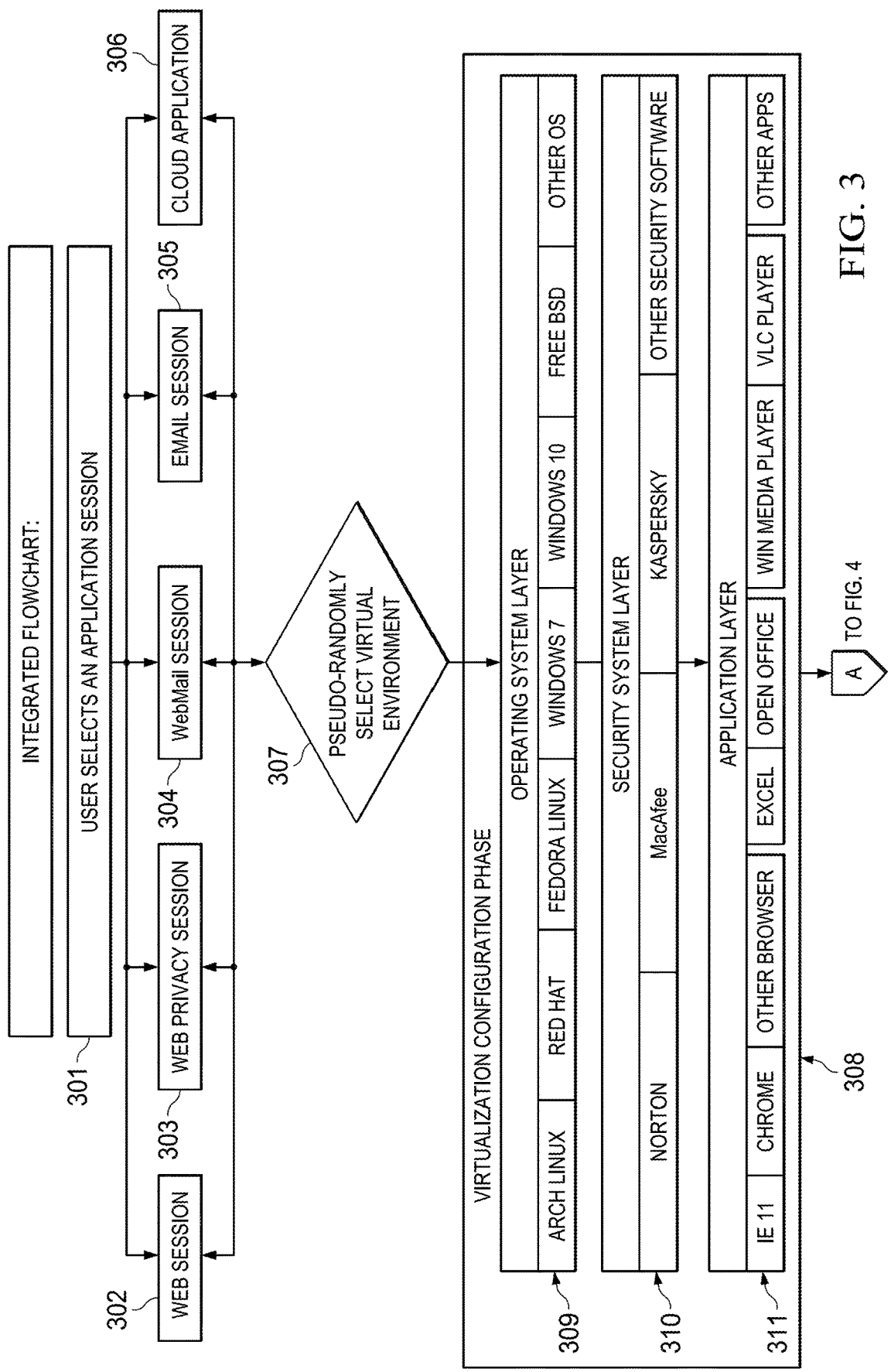

FIG. 3 illustrates a preferred process for creating a virtual environment to achieve the requirements of the user in a configuration of operating system, security system and application that is difficult for malicious software to infect. In Block 301 the user initiates an application session by requesting a particular type of application. Typical application sessions types include, but are not limited to, web browsers (Block 302), web privacy sessions (Block 303), webmail sessions (Block 304), e-mail sessions (Block 305), spreadsheet view or edit, document view or edit, and cloud applications (Block 306). VM3 uses built-in operational knowledge and instructions maintained from a central server to pseudo-randomly select a virtual environment (Block 307) that can perform the tasks requested by the user.

Block 308 selects an appropriate virtual machine that has been configured with an operating system (Block 309), a security system (Block 310) and an application (Block 311).

Figure 4:
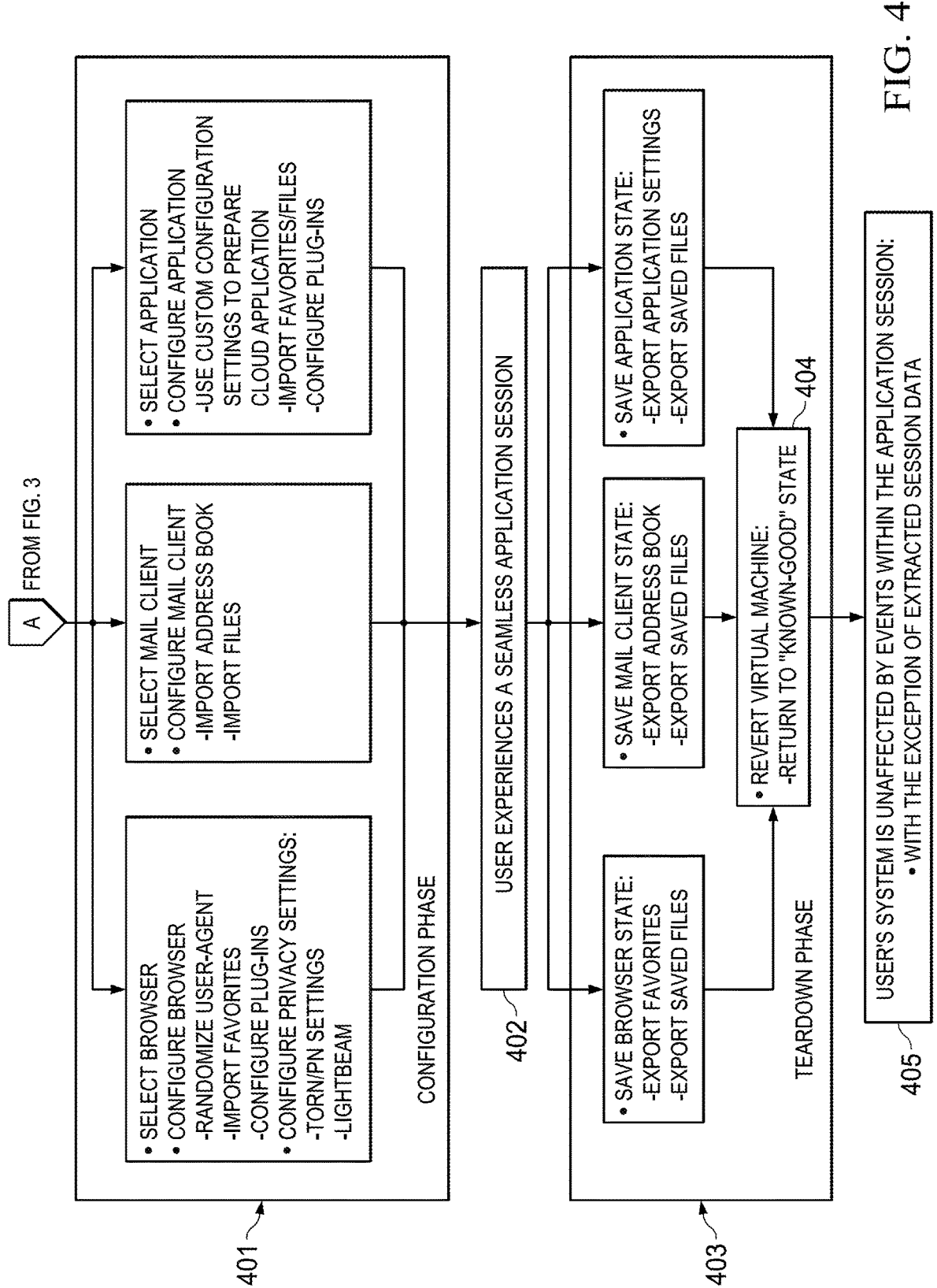

FIG. 4 describes the preferred configuration, application session initiation, application session use, and application session teardown phases of one implementation of the principles of the present invention. In Block 401 the appropriate program is executed inside the virtual machine to achieve the user's goals, and it is configured to maintain their settings, preferences and favorites from previous sessions. This allows the user to see the same or very similar environment the next time they make a similar request for an application session. Block 402 shows the user interacting with the program and eventually entering the teardown phase in Block 403. Each application type will have a different type of teardown. During this phase the changes to the application and environment are detected and moved outside the virtual machine as previously described in conjunction with FIG. 1, Block 111 and Block 117. All settings and files necessary to later restore this session are saved. In Block 404 the Virtual Machine Manager Module reverts the virtual machine to a "known-good" state to prepare it for its next use. It is during this phase that any contamination that took place during the session would be rendered inert. Block 405 notes that the Host system is completely unaffected by anything that took place inside the virtual machine with the exception of extracted files and settings.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A host computer processing system comprising:
a host processor and an associated host memory system;
a host operating system executed by the host processor;

a virtualization management program running on the host processor for instantiating virtual machines in a manner to create a constantly shifting attack surface to increase the difficulty of penetrating instantiated virtual machines, wherein, in response to a user request made through a user interface to the host operating system to perform a function requiring launching of an application program capable of performing the function, the virtualization management program is operable to:
   select pseudo-randomly, transparently and automatically one of a plurality of available virtual machines capable of running the application program, each of the plurality of virtual machines having a different configuration and including a virtual operating system;
   instantiate the virtual machine that is selected transparently and automatically;
   launch an application session with the application capable of performing the function via the selected and instantiated virtual machine; and
   reverting, upon closing the application session, the selected and instantiated virtual machine to a known good state.

2. The host computer processing system of claim 1, wherein the selected virtual machine is further operable to execute a security program for managing an attack initiated during execution of the selected application program by the virtual machine.

3. The host computer processing system of claim 1, wherein the virtualization management program is further operable to select the application program running in conjunction with the virtual operating system from among of a plurality of application programs capable of performing the function.

4. The host computer processing system of claim 1, wherein the virtual machine includes a plurality of application programs capable of providing the requested function and the virtualization management program is further operable to select one of the plurality of application programs to implement the requested function.

5. The host computer processing system of claim 4, wherein at least two of the plurality of application programs are operable to implement the function.

6. The host computer processing system of claim 1, wherein at least two of the plurality of virtual machines include different operating systems.

7. The host computer processing system of claim 1, wherein the virtualization management program is further operable to import user preferences for the virtual application program from the host memory system on instantiation of the virtual application program.

8. The host computer processing system of claim 1, wherein the virtualization management program is further operable to revert the virtual machine to a known-good state upon completion of the requested function.

9. The host computer processing system of claim 1, wherein the virtualization management program is further operable to selectively save files generated by the application program to the host memory system in response to a request from the user through the user interface.

10. The host computer processing system of claim 1, wherein the virtualization management program is further operable to analyze the virtual machine for unauthorized modifications and selectively disable the virtual machine in response.

11. The host computer processing system of claim 1, wherein the virtualization management program is further operable to contact a server external to the processing system to retrieve and store within the host system memory at least one of the plurality of virtual machines.

12. The host computer processing system of claim 1, wherein each virtual machine simulates a different one of a plurality of possible combinations of hardware configurations and operating systems.

13. The host computer processing system of claim 12, wherein each of the plurality of available virtual machines further comprises a security software package.

14. A method of securely operating a processing system including a host processor, a host operating system running on the host processor, a user interface, and a memory system to create a constantly shifting attack surface to increase the difficulty of penetrating a virtual machine, the method comprising:
   in response to the host system receiving through the user interface a user request through the user interface to perform a function that requires launching a session of an application program to perform the function;
   selecting a previously configured virtual machine pseudo-randomly from a plurality of previously configured virtual machines that are capable of running the application program to perform the function;
   instantiating a session of the selected virtual machine within the memory system;
   launching a session of the application program via the selected previously configured virtual machine for execution by the selected virtual machine;
   in response to user inputs through the user interface, executing operations with the application program running on the selected virtual machine to implement the function such that the host operating system is isolated from an attack initiated during execution of the virtual application program by the virtual machine; and
   in response to user input to close the session, reverting the virtual machine to a known good state.

15. The method of claim 14, wherein a plurality of applications programs capable of performing the function and executable by the selected previously configured virtual machine for implementing the function may be selected; and wherein the method further comprises selecting the application program from the plurality of application programs before launching the session of the application program.

16. The method of claim 14, wherein the plurality of virtual machines run different virtual operating systems.

17. The method of claim 14, further comprising transferring stored user preferences for the launched application program from the memory system to the virtual machine.

18. The method of claim 14, further comprising transferring files changed or generated during the session of the application programming running on the selected virtual machine from the selected virtual machine to the memory system in response to user input to close the selected application session.

19. The method of claim 14, wherein instantiating the selected virtual machine further comprises retrieving the virtual machine from an external source and storing the virtual machine in the memory system.

20. The method of claim 14, further comprising launching a virtual security program with the selected virtual machine during execution of the virtual applications program.

21. The method of claim 14, further comprising receiving incremental updates from an external source for updating the selected virtual machine.

22. The method of claim 21, wherein receiving incremental updates comprises receiving an incremental update to the application program.

23. The method of claim 21, wherein receiving incremental updates comprises receiving an incremental update to a operating system run by the selected virtual machine.

24. The method of claim 21, further comprising periodically validating the integrity of the selected virtual machine.

* * * * *